Dec. 26, 1967 S. G. McCLELLAN 3,359,690
TOOL SHARPENING GUIDE
Filed Oct. 19, 1965 2 Sheets-Sheet 1

INVENTOR.
STANFORD G. McCLELLAN
BY
Barnes, Kisselle, Raisch & Choate
ATTORNEYS

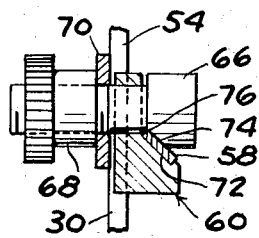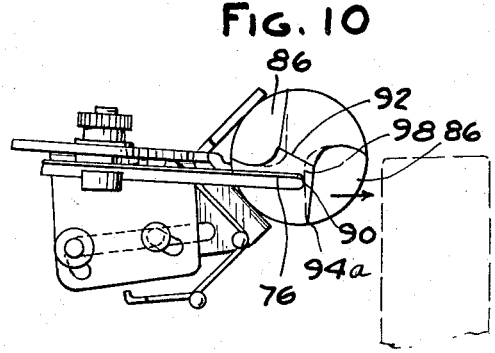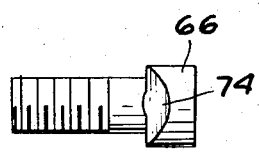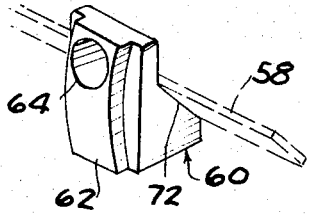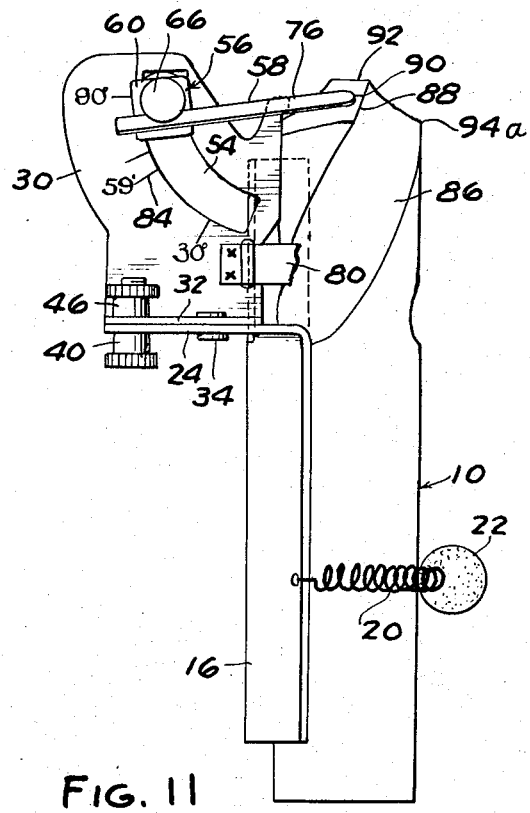

United States Patent Office 3,359,690
Patented Dec. 26, 1967

3,359,690
TOOL SHARPENING GUIDE
Stanford G. McClellan, 19445 Oakfield,
Detroit, Mich. 48235
Filed Oct. 19, 1965, Ser. No. 497,990
18 Claims. (Cl. 51—219)

This invention relates to a tool sharpening gage for fluted tools such as drills, taps, reamers, etc.

Heretofore, there have been available gages designed to check the correctness of the cutting edges of fluted tools after sharpening. However, after such tools are sharpened and checked by means of such gages, it frequently happens that the tool has to be reground to effect a correction of the angle of the cutting edge, the length thereof, etc.

The primary object of my invention is to provide a tool sharpening gage which enables the multiple cutting edges of fluted tools to be manually sharpened quickly, easily and correctly without the need for tool holding fixtures, jigs, etc. More specifically, my invention provides a means to obtain a correctly sharpened cutting edge on a fluted tool by visual observation during the actual hand grinding operation, thus eliminating entirely the necessity of the usual checking operations normally necessary when such tools are sharpened.

A further object of my invention is to provide a tool sharpening gage which enables the user to determine the desired location of a suitable new cutting edge by simply placing a guide reed in front of, upon and/or just below the line of the desired cutting edge on the wall of the flute. The correct cutting edge is obtained by manual manipulation of the tool against a grinding wheel surface and grinding away the end face of the tool down to the line of demarcation established by the guide reed. The tool is then revolved in the body of the gage to present another cutting edge to be ground to the guide reed and thereby enable the second or successive edges of the tool to be similarly ground.

A further object of my invention is to provide a tool sharpening gage provided with a guide reed thereon which is adapted to be adjusted to enable grinding on the tool a correctly centered web of correct thickness at the cutting end of the tool.

Further objects and advantages of the tool sharpening gage of the present invention will become apparent from the accompanying description and drawings in which:

FIG. 7 is a sectional view along the line 7—7 in FIG. 1 showing the means for adjustably clamping the guide reed in position.

FIG. 8 is a detail view of the clamping screw shown in FIG. 7.

FIG. 9 is a detail perspective view of the clamping block shown in FIG. 7.

FIG. 10 is a view illustrating the manner in which the gage of this invention is adjusted for grinding a correctly centered web of correct thickness adjacent the cutting end of a drill.

FIG. 11 is a side elevational view of the arrangement illustrated in FIG. 10.

Figure 1:
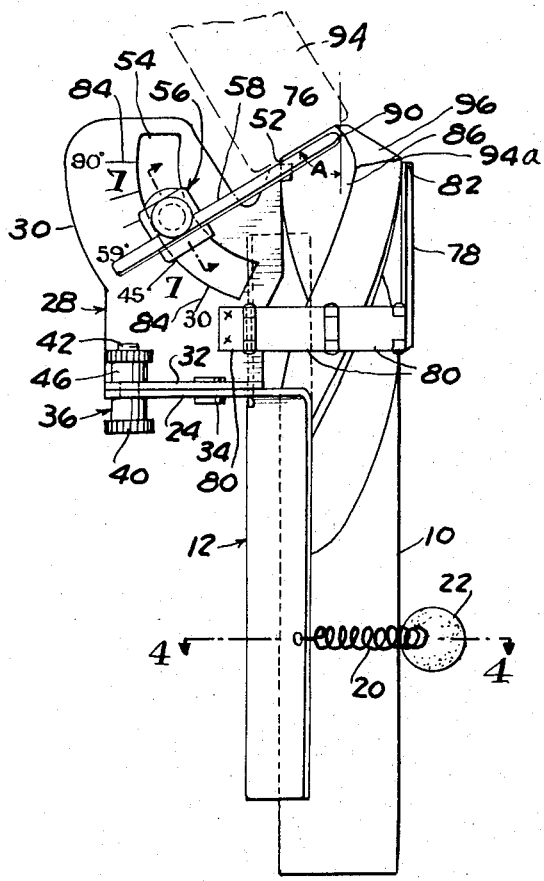
FIG. 1 is a side elevational view of a tool sharpening gage of the present invention showing the manner in which it is adjusted for sharpening a drill.
Figure 4:
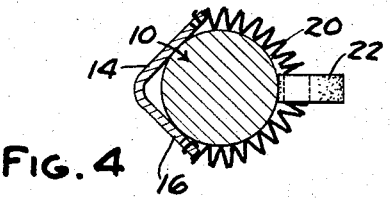
FIG. 4 is a sectional view along the line 4—4 in FIG. 1.
Figure 6:
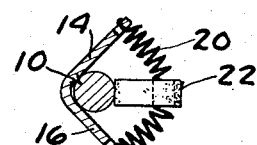
FIG. 6 is a top view of the gage body.
Figure 5:
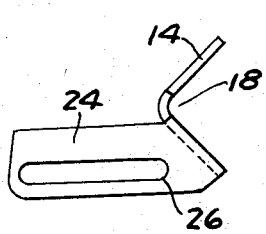
FIG. 5 is a view similar to FIG. 4 and showing a drill of substantially smaller diameter retained on the gage.

For the purpose of illustration, the tool sharpening gage of the present invention is shown in connection with sharpening of a drill 10. However, as the description proceeds, it will be apparent that the sharpening gage is adapted to be used with any fluted cutting tools such as taps, reamers, etc., of the type having cutting edges adjacent the flutes at the end thereof opposite the shank. The gage generally comprises a body 12 having a pair of angularly related walls 14, 16 which provide a V-shaped trough 18 in which the drill is adapted to be fixedly retained by means of a shank encircling spring 20 having a circular rubber lug 22 thereon through which spring 20 extends in an off-center relation to enable retention in the trough 18 of tools which differ substantially in diameter such as shown in FIGS. 4 and 5. In the case of larger diameter tools, lug 22 is adjusted as shown in FIGS. 1 and 4 and in the case of relatively small diameter tools, lug 22 is rotated to the position shown in FIG. 5 to engage the shank of the tool and thus retain it firmly in trough 18. It will be observed that wall 14 is extended upwardly as at 14′ beyond the upper end of wall 16 to provide maximum contact with the drill land and thus prevent the drill from wobbling.

In the embodiment illustrated in the drawings, the body 12 of the gage is formed of sheet metal and at the upper end of wall 16 there is provided a flange 24 which extends perpendicular to the axis of the trough formed by the side walls 14, 16. Flange 24 is provided with an elongated slot 26. An angle plate 28 has an upright wall 30 and a base 32, base 32 being adjustably mounted on flange 24 by means of a rivet 34 and a clamping screw assembly 36. Rivet 34 extends through an arcuate slot 38 in base 32 and the elongated slot 26 in flange 24. Rivet 34 permanently connects angle plate 28 to body 12 but not so tightly as to prevent relative adjustment thereof. Clamping screw assembly 36 includes a screw 40 having a shank 42 extending upwardly through slot 26 in flange 24 and a second arcuate slot 44 in base 32. Nut 46 is threaded on shank 42 and is adapted to be tightened to clamp angle plate 28 on flange 24 in fixed position.

Angle plate 28 has a flute engaging guide tip 48 thereon. Guide tip 48 may take several forms and in the illustrated embodiment, it comprises a lug which is offset from the plane of upright wall 30 and includes a vertically extending guide shoulder defined by a vertically extending bend line 50. Guide tip 48 is formed integrally with angle plate 28 and is fixed thereon. The intersection of the upper end of guide tip 48 and the vertical bend line 50 forms a guide point 52. The arcuate slots 38, 44 on base 32 are struck about bend line 50 as an axis. Upright wall 30 is likewise provided with an arcuate slot 54 which is struck about the guide point 52 as an axis.

Within slot 54, there is arranged a clamp assembly 56 for a reed 58. Reed 58 comprises a thin strip of shelf-supporting material such as spring steel or the like. The clamp assembly for reed 58 comprises a clamp block 60 having an arcuate lug 62 formed on the backside thereof for interfitting engagement with slot 54. Block 60 has an opening 64 therein extending through lug 62 for reception of the shank of a clamping screw 66. Block 60 is adapted to be clamped in fixed position in slot 54 by means of a circular nut 68 adapted to be threaded on the end of screw 66 so as to bear against a washer 70 overlapping slot 54 on the backside of upright wall 30. For reasons which will become apparent hereinafter, reed 58 is clamped in position so that the plane thereof is inclined at an acute angle to the plane of upright wall 30. Accordingly, block 60 is fashioned with an inclined seat 72 in the form of a groove and the head of screw 66 is provided with an inclined flat face 74 on the underside thereof between which reed 58 is adapted to be clamped when nut 68 is tightened. The inclined seat 72 on block 60 is fashioned such that the edge 76 of reed 58 defines a radial line extending through guide point 52. It will be observed that by loosening nut 68, clamping block 60 may be shifted along the arcuate slot 54 so that reed 58 pivots about guide point 52. At the same time, reed 58 can be adjusted lengthwise so that the end thereof projecting towards trough 18 can be projected a greater or lesser extent beyond guide tip 48.

An upright indicator 78 is hinge supported on upright wall 30 for swinging movement in a horizontal plane by means of a plurality of hinge plates 80. The pintles interconnecting hinge plates 80 extend vertically and the upper end 82 of indicator 78 swings in a horizontal plane at the level of guide point 52 on the guide tip 48.

When it is desired to use the above described gage for sharpening the cutting edge of a drill, the drill is placed in the trough 18 of body 12 and retained therein in relatively fixed position by spring 20 and lug 22. Nut 68 is loosened and clamp 60 is adjusted in slot 54 so that the angle of inclination of reed 58 corresponds to the included angle A desired between the axis of the drill and the desired cutting edge, commonly referred to as the drill point angle. In this connection, suitable indicia 84 are provided along slot 54 to facilitate adjustment of reed 58 to the desired drill point angle. The drill 10 is then adjusted lengthwise and rotatively in trough 18 so that reed 58 extends into one of the flutes 86 of the drill adjacent the existing cutting lip 88 which is to be resharpened. Reed 58 is adjusted lengthwise so that its distal end 90 extends to the web 92 of the drill.

Figure 2:
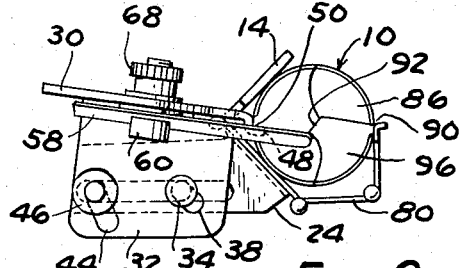
FIG. 2 is a top view of the arrangement shown in FIG. 1.
Figure 3:
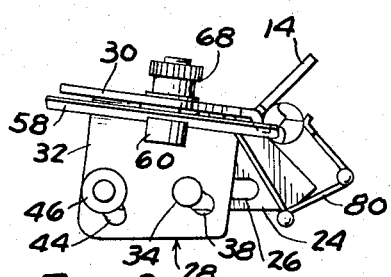
FIG. 3 is a view similar to FIG. 2 and showing a drill of substantially smaller diameter retained on the gage.

It will be appreciated that nut 46 is loosened to enable adjustment of angle plate 28 on flange 24. This is necessary because guide tip 48 must be positioned such that bend line 50 engages the edge of the drill land adjacent the cutting edge to be sharpened. Depending on the diameter of the drill angle, plate 28 will be shifted along slot 26 toward or away from trough 18. Likewise, it may be necessary to rotate angle plate 28 as permitted by arcuate slots 38, 44 about bend line 50 as an axis to angularly align reed 58 with the edge of the drill being sharpened (FIG. 2).

With the reed 58 adjusted in the above described manner relative to the cutting edge of the drill, the user may then manually manipulate the gage-supported drill against the peripheral face of a grinding wheel 94 to sharpen the cutting edge by grinding the drill point down to the line of demarcation established by the straight edge 76 of reed 58.

After one of the cutting edges is thus sharpened, the drill is retracted slightly in trough 18 so that its cutting end clears reed 58. It is then rotated 180° to bring the opposite cutting edge into position adjacent the straight edge 76 of reed 58. In order to insure that the second cutting edge will be identical and symmetrical relative to the first edge sharpened, the drill is adjusted lengthwise so that the outside corner 94a of the previously sharpened edge coincides with the upper end 82 of indicator 78 (FIGS. 1 and 2). The second cutting edge is then sharpened by again grinding away the point of the drill down to the line of demarcation established by the straight edge 76 of reed 58.

Resharpening drills, particularly large diameter drills, usually results in an undesirable increase in the effective thickness of the web 92 at the drill point. This necessitates reducing the thickness of the web to a proper dimension. In reducing the web thickness, care must be exercised so that the web will be properly centered on the drill. The gage described is admirably suited for thinning the web when necessary. To accomplish this, nut 68 is loosened and reed 58 is adjusted as shown in FIGS. 10 and 11 so that it lies flatly against the lip clearance end surface 96 of the drill near the center web. By using the end 90 of reed 58 as one point and the outside cutting edge corner 94a as another point to establish a generally straight gage line as indicated at 98 in FIG. 10, the drill bit may be aligned against the side face of the grinding wheel as shown to obtain a straight edge on the drill from the corner 94 to adjacent the center portion of the web. Then, upon rotating the drill 180° and repeating the operation on the opposite cutting edge, each of the cutting edges will then be symmetrical to a centered web of the desired thickness. Obviously, the hinged indicator 78 would be pivoted to a retracted position as shown in FIG. 10 during this web thinning operation.

I claim:

1. A gage for sharpening a fluted tool such as a drill, tap, reamer or the like comprising a support body adapted to be manually manipulated and having means thereon for retaining the tool for both rotative and axial adjustment, said body having a gage supporting member thereon, said gage supporting member having a guide tip fixed thereon and being shiftable on the body in a plane perpendicular to the axis of the tool shank in a direction toward and away from the tool to enable interengagement of said guide tip with the longitudinally extending edge of a flute on the tool adjacent the cutting end thereof, a gage element on said gage supporting member, said gage element having a longitudinally extending straight edge aligned with said guide tip, said gage element being pivotally adjustable relative to said body in a plane parallel to the axis of the tool shank about said guide tip as a center and also about an axis passing through the guide tip and parallel to the axis of the tool shank whereby so gage element is adapted to be adjusted on said body so that its longitudinal edge extends into a flute of the tool adjacent the cutting end thereof and in engagement with a portion of the flute to establish a line of demarcation defining the cutting edge of the tool to be sharpened.

2. A gage for shapening a fluted tool such as a drill, tap, reamer or the like comprising a support body adapted to be manually manipulated and having means thereon for retaining the tool for both rotative and axial adjustment, said body having an upright gage supporting member thereon, said gage supporting member having a fixed guide tip thereon and being adjustable on the body for pivotal movement in a plane perpendicular to the axis of the tool shank about said guide tip as a center, said upright member also being shiftable on said body in a plane perpendicular to the axis of the tool shank in a direction toward and away from the tool to enable interengagement of said guide tip with the longitudinally extending edge of a flute on the tool adjacent the cutting end of the tool, a gage element on said upright member, said gage element having a longitudinally extending straight edge aligned with said guide tip, said gage element being pivotally adjustable on said upright member in a plane parallel to the axis of the tool about said guide tip as a center.

3. A sharpening gage for a fluted tool such as a drill, tap, reamer or the like comprising a body having a pair of angularly related side walls for engaging the periphery of the tool, means for retaining a tool on said body with its peripheral surface engaged by said side walls and with its cutting end projecting above the upper end thereof, said body having a flange thereon extending in a plane perpendicular to the planes of said side walls, an angle plate having a base mounted on said flange and an upright wall perpendicular thereto, said upright wall having a fixed guide tip thereon adapted to engage the longitudinal edge of the flute on the tool adjacent the cutting end thereof, an elongate guide reed mounted on said upright wall for pivotal adjustment in a vertical plane about said guide tip as an axis, said angle plate being adjustable on said flange to enable engagement of the guide tip with the longitudinal edge of the flute of different diameter tools retained on said body.

4. A tool sharpening gage as called for in claim 3 wherein said guide reed is adjustable in a lengthwise direction on said upright wall to vary the extent to which it projects radially beyond said guide tip.

5. A tool sharpening gage as called for in claim 3 wherein said angle plate is pivotally adjustable on said flange for movement in a generally horizontal plane about said guide tip as a vertical axis.

6. A tool sharpening gage as called for in claim 3 including means swingably supported on said angle plate and having an indicator thereon adapted to engage the periphery of a tool retained on said body at a point circumferentially spaced from said guide tip.

7. A tool sharpening gage as called for in claim 6 wherein said means for swingably mounting said indicator comprises a plurality of members hinged together about substantially vertically extending axes.

8. A tool sharpening gage as called for in claim 3 including an indicator on said body having means thereon adapted to engage a tool retained on said body at the level of said guide tip and generally diametrically opposite thereof, said indicator being movable to an out-of-the-way position relative to the cutting end of the tool whereby after one cutting edge of the tool is sharpened down to a line aligned with said guide tip, the tool may be rotated on said body to a position wherein the outer end of the previously sharpened cutting edge is aligned with said indicator means to enable another cutting edge to be similarly ground.

9. A tool sharpening gage as called for in claim 3 wherein said reed comprises an elongate strip of thin self-supporting material, the plane of which is inclined to the upright wall of the angle plate at an acute angle.

10. A tool sharpening gage as called for in claim 3 wherein the means for pivotally adjusting the reed comprises an elongate arcuate slot in the upright wall of the angle plate which is struck about said guide tip as a center and means supporting said reed and engaging said slot for arcuate movement therealong.

11. A tool sharpening gage as called for in claim 9 wherein the reed is supported between a pair of clamp members and threaded means are provided for tightening the clamp members on the reed, said reed being shiftable lengthwise between the clamp members in a direction radially through said guide tip.

12. A gage for sharpening a fluted tool such as a drill, tap, reamer or the like comprising an elongate body having a V-shaped trough portion and means thereon for retaining a tool therein in an upright position with the walls of the trough engaging the periphery of the tool and with the cutting end of the tool projecting upwardly beyond the upper end of the trough, said body having a support bracket thereon, an upright member mounted on said support bracket, said upright member having a guide tip thereon and being adjustable on the support bracket toward and away from said trough to enable positioning of the guide tip in engagement with the longitudinal edge of a flute on the tool retained in the trough, a reed mounted on said upright member and having a longitudinally extending edge aligned with said guide tip, said reed being pivotally adjustable on said body in a vertical plane about said guide tip and about a vertical axis passing through said guide tip.

13. A tool sharpening gage as called for in claim 12 wherein the reed is adjustable lengthwise so as to vary the length thereof projecting beyond the guide tip toward said trough.

14. A tool sharpening gage as called for in claim 12 including means on said upright member for indicating the level of the guide tip on the side of the tool opposite the guide tip.

15. A tool sharpening gage as called for in claim 12 wherein the upright member is pivotally adjustable on the body in a horizontal plane about the vertical axis of the guide tip as a center.

16. A tool sharpening gage as called for in claim 12 including an arcuate slot on said upright member struck about said guide tip as a center and means shiftable along said slot and supporting said reed.

17. A tool sharpening gage as called for in claim 6, wherein said means for swingably mounting the indicator comprises a support member for the indicator which is hingedly connected to said angle plate about a substantially vertically extending axis.

18. A tool sharpening gage as called for in claim 9, wherein the reed is supported between a pair of clamp members and means are provided for tightening the clamp members against the reed.

References Cited

UNITED STATES PATENTS

| | | | |
|---|---|---|---|
| 403,175 | 5/1889 | Brewer | 51—219 X |
| 1,095,338 | 5/1914 | Mallory | 51—219 X |
| 1,106,692 | 8/1914 | Wincrantz | 51—219 |

HAROLD D. WHITEHEAD, *Primary Examiner.*